(No Model.) 3 Sheets—Sheet 1.
D. HAZARD.
MACHINE FOR SHARPENING SAW TEETH.
No. 529,789. Patented Nov. 27, 1894.
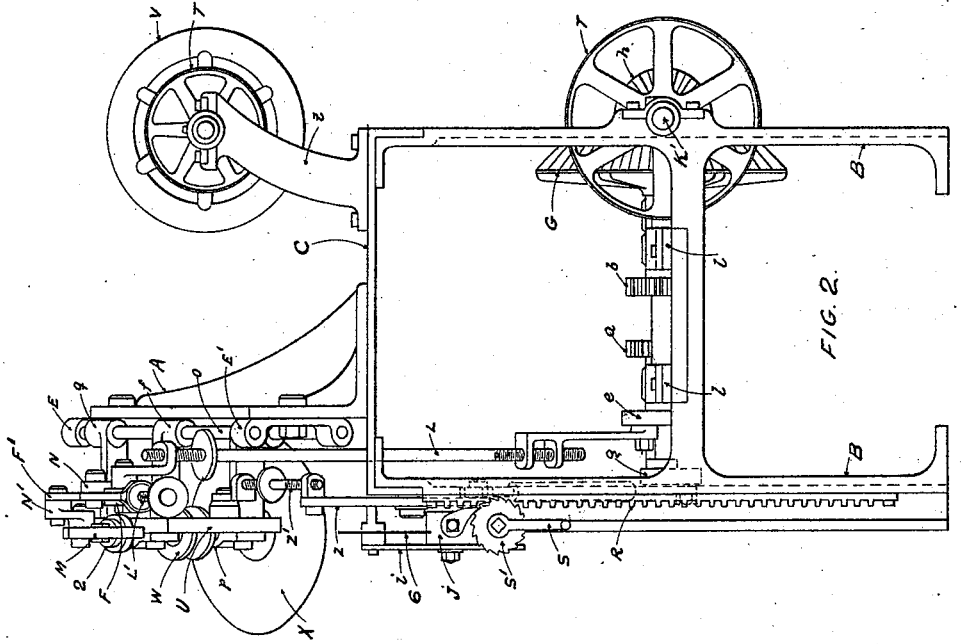
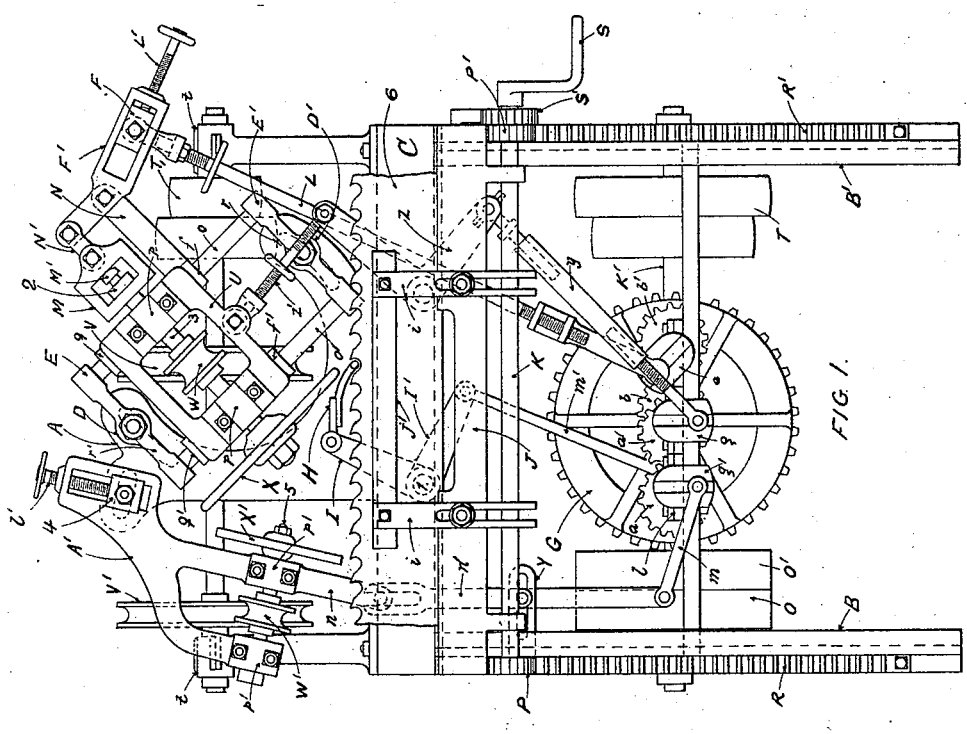
WITNESSES
Axel Hartman
Mary L. Raymond.
INVENTOR
Doctor Hazard

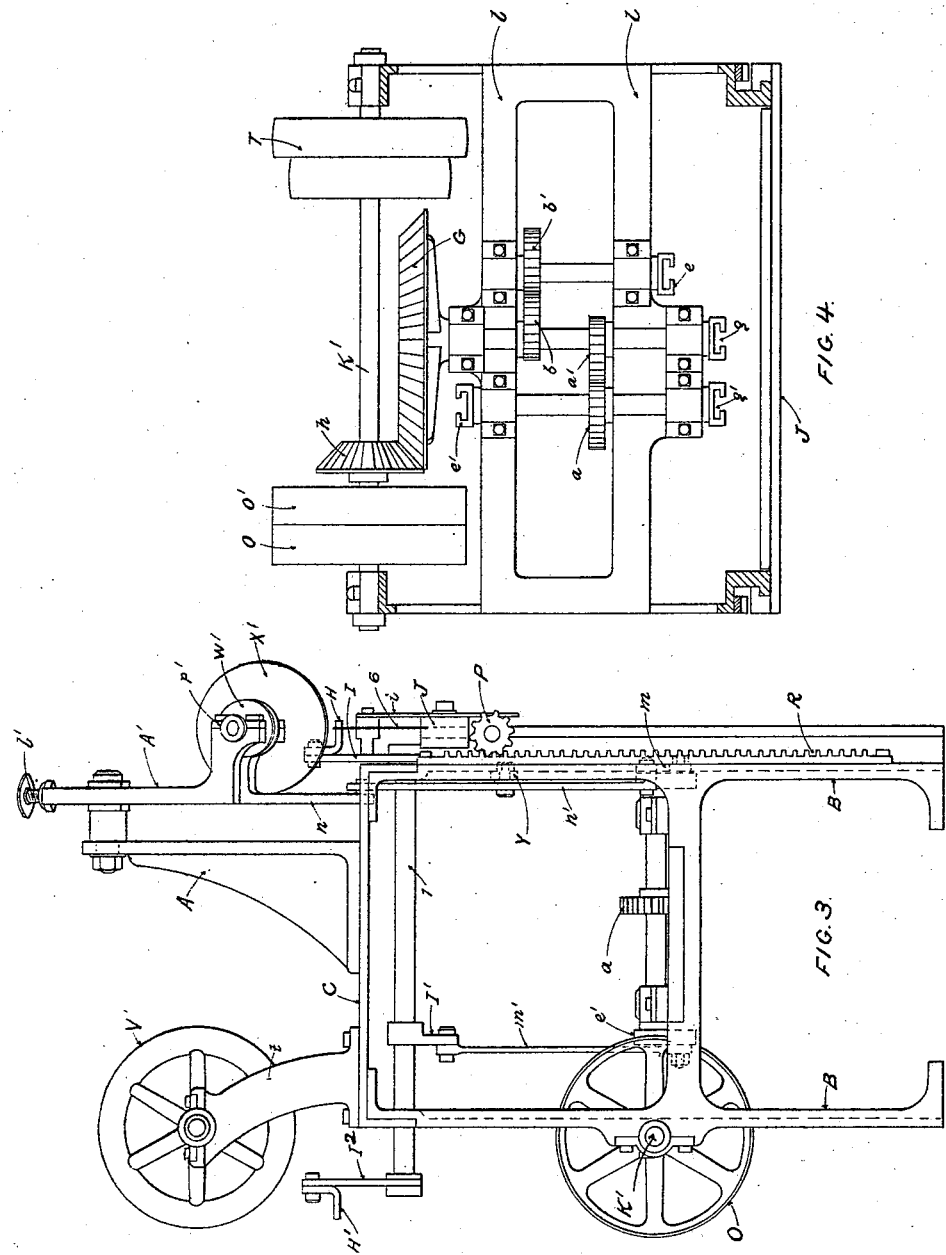

(No Model.) 3 Sheets—Sheet 3.
D. HAZARD.
MACHINE FOR SHARPENING SAW TEETH.
No. 529,789. Patented Nov. 27, 1894.
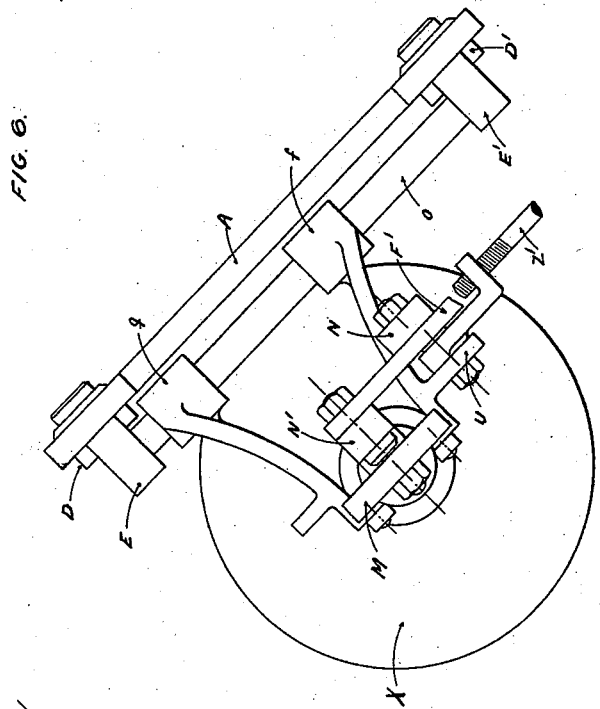
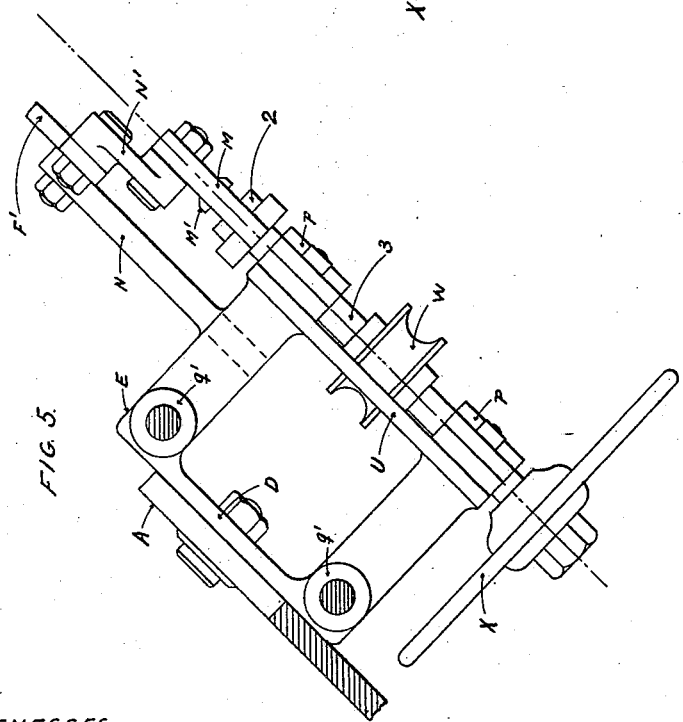
WITNESSES
INVENTOR

UNITED STATES PATENT OFFICE.

DEXTER HAZARD, OF MARQUETTE, MICHIGAN.

MACHINE FOR SHARPENING SAW-TEETH.

SPECIFICATION forming part of Letters Patent No. 529,789, dated November 27, 1894.

Application filed May 28, 1894. Serial No. 512,825. (No model.)

*To all whom it may concern:*

Be it known that I, DEXTER HAZARD, of Marquette, in the county of Marquette and State of Michigan, have invented a new, novel, and Improved Machine (which will be automatic in its operation) for Sharpening Solid Saw-Teeth Formed on the Arcs of Circles, of which the following is a specification.

My invention has for its object the production of a mechanism which will be automatic in its operation, for sharpening saw teeth formed on the arcs of circles, as above stated; also for sharpening teeth, the faces of which are formed by the semi-circle of an arc, except the cutting point, and the backs of which are formed upon the tangents of the arc, as above stated; and is an improvement upon the invention described in my Patent No. 518,187, and is of a type similar thereto.
In the drawings Figure 1 is a face view of my invention, with a section of a band saw in position, as will appear when ready for operation. Fig. 2 is a right-hand end view of my invention. Fig. 3 is a left-hand end view of my invention. Fig. 4 is a plan view of the frame which holds in position the gear-wheels and shafting that operate the cranks. Figs. 5 and 6 are detailed views of frame U and standard N.
C is the frame of the machine.

A is a bracket held to frame C by bolts.

E and E' are double boxes connected to the bracket A by bolts, which hold the guide rods $o$ and $o'$ in position.
U is a sliding frame which is held to the guide rods $o$ and $o'$ by boxes $q$ and $f$.

3 is an arbor held to the frame U by boxes $p$.

W is a pulley which drives arbor 3.

X is an emery wheel held in position by arbor 3.

Z' is a threaded rod, which connects the sliding frame U to elbow Z. Elbow Z is held to the frame C by a bolt.

$y$ is a rod which connects elbow Z to crank $g$ which moves the sliding frame U up and down on the guide-rods $o$ and $o'$. Crank $g$ receives its motion from a shaft which is driven by the large gear wheel G which is driven by a small pinion $h$ receiving its motion from shaft K'.

M is a collar through which arbor 3 passes. Said collar M is provided with an upright extension.

2 is a set-collar, which is fastened upon the end of arbor 3, and holds the arbor in position in the collar M.

M' is a set-screw which enters the end of arbor 3, and is for the purpose of taking up any slack motion that may result from wear between collar M and set-collar 2.

F' is a rocking bar, which is connected to the extension on collar M by link N'.

N is a standard cast to the sliding frame U. Rocking bar F' is held in position by a bolt which connects it to the standard N.

F is a sliding box, held in position by a slot in the bar F'. Box F is moved back and forth in the slot of bar F' by the threaded rod L'.

L is a threaded rod which connects box F and bar F' to crank $e$. Crank $e$ is operated by a shaft, which receives its motion from elliptical gear wheels $b$ and $b'$. Rod L, box F and bar F', connecting link N' and collar M are for the purpose of giving arbor 3 end motions, at the same time the sliding frame U moves up and down on the guide-rods $o$ and $o'$.

A' is a swinging frame.

4 is a small box which corresponds to the size of the slot in frame A'. Box 4 is connected to a projection on bracket A by a bolt, and which holds frame A' in position.

$n$ is an extending lug cast to the bottom of frame A', and is connected to the upright bar $n'$ by a bolt. Bar $n'$ is held in position by a bolt which connects it to the projecting lug Y, which is cast to leg B. Bar $n'$ gives the frame A' a forward and back motion. $m$ is a rod which connects bar $n'$ to crank $g'$. Crank $g'$ operates rod $m$, which operates the upright bar $n'$. Crank $g'$ receives its motion from a shaft, which is operated by elliptical gears $a$ and $a'$. Gear wheels $a'$ and $b$ are on the same shaft, which holds the large gear wheel G in position.

5 is an arbor held in position by boxes $p'$ to swinging frame A'.

X' is an emery wheel held in position and operated by arbor 5.

W' is a pulley which drives arbor 5.

6 is a section of a band saw.

J is a rest which holds the saw in position under the stones X and X'. The dotted lines indicate a groove in the rest J, which holds the back of the saw in position.

J' is a guide which holds the saw against another guide which is on the opposite side of the saw and connected to frame C. These guides are for the purpose of keeping the saw directly under the center of the stones X X'.

i are steel springs connected by bolts to the rest J and hold the guide J' in position.

I' is an arm on shaft 1.

m' is a rod which moves the end of arm I' up and down. Rod m' is operated by crank e' upon the opposite end of the same shaft which operates the crank g.

I is an upright arm held in position by shaft 1.

H is a pawl connected to the end of the upright arm I. The up and down motions of arm I' to which rod m' is attached gives the shaft 1 its motion, which gives the end of the upright arm I to which pawl H is attached, an oscillating motion, and is for the purpose of causing the pawl H to move the saw and leave the teeth in position to be sharpened by the stones X and X'.

l' is a threaded rod which passes through the top of the frame A'. Rod l' is also connected to box 4 and is for the purpose of raising or lowering the frame A', in order to bring the edge of the stone X' in contact with the tops of the teeth, as may be desired. The purpose of the threaded rod L' is to move sliding box F back and forth in the slot in the bar F' which increases or decreases the distance between the center of box F and the pivot bolt which holds bar F' to standard N, in order to regulate the amount of end throw which rocking bar F will give to arbor 3. The purpose of threaded rod L is to raise or lower box F, which will change the position of rocking bar F', which will also change the location of arbor 3, and will allow the operator to bring the edge of stone X in contact with the face of the teeth, as may be desired.

t are standards connected to frame C by bolts.

V' is a groove pulley, which is connected to the pulley W' by a round belt.

V is also a groove pulley which is connected to the pulley W on arbor 3 by a round belt. Pulleys V and V' are held in position by a shaft, which is held in position by the standards t.

T is one pair of cone pulleys, held in position by shaft K'.

T' is a pair of cone pulleys held in position by the shaft which drives pulleys V and V'. The cone T is connected to the cone T' by a belt which gives the shaft of pulleys V and V' its motion.

O is a loose pulley.

O' is a pulley fastened to the shaft K', which also holds the loose pulley O in posiion. Pulley O' is connected by a belt to whatever motive power may be used to operate the machine.

R and R' are racks connected by bolts to legs B and B', which are the legs of the machine. P and P' are small pinions, the teeth of which correspond in size to the teeth on racks R and R'.

K is a shaft which is held in position by lugs cast to the bottom of the rest J. Shaft K holds the pinions P and P' in position.

S' is a ratchet-wheel held in position by shaft K. The end of the rest J is provided with a small dog, directly over the ratchet-wheel S'.

S is a crank connected to the end of shaft K and is for the purpose of allowing the operator to turn the shaft K which will cause the pinions P and P' to raise or lower the rest J and bring the saw to its desired position under the stones X and X'. The ratchet-wheel S and the dog upon the end of the rest J are for the purpose of holding the rest J in its desired position.

l is a frame which is connected to legs B. The purpose of the frame l is to hold the shafting upon which the gear-wheels G, a and a', and b and b' are located in position.

$I^2$ and H' are duplicates of upright arm I and pawl H and are held in position by the opposite end of the same shaft 1 which operates arm I and pawl H.

To sharpen a right hand band saw, it will be necessary to have the machine within the inside circumference of the saw; and to keep the saw revolving around the machine it is necessary to have pawl H' move one side of the saw according as pawl H moves the opposite side; which result is accomplished with the use of brackets attached to the stationary standards connected to the floor of a filing room which hold the saw in position, but form no part of my invention. As the stones X and X' move upward and away from the points of the teeth, the pawl H comes forward against the face of a tooth and moves the saw so as to leave said tooth in position to be ground or sharpened by the stone X, as it comes downward, and is thrown around the circle which forms the face and throat of each tooth; during which time, the stone X' will be thrown back and forth over the outer point line of another tooth, which is left in position accordingly, as the pawl H adjusts the teeth under the stone X.

What I claim is—

1. In a saw sharpening machine, the combination with supporting bracket A, and guide-rods o and o' mounted thereon; of frame U slidably mounted upon said rods; arbor 3 journaled in said frame U; connecting rod Z'; elbow Z; rod y connected to crank g; set-collar 2; set-screw M'; collar M, provided with upright extension; connecting link N'; rocking bar F'; standard N; box F; rod L'; rod L; crank e; elliptical gears b and b'; gear wheel G; pinion h and shaft K'; all substantially as shown and described.

2. In a saw sharpening machine, the combination with pawl H; upright arm I; pawl H'; upright arm $I^2$; shaft 1; arm I'; connecting rod $m'$; crank $e'$; elliptical gears $a$ and $a'$; gear wheel G; pinion $h$ and shaft K'; all substantially as shown and described.

3. In a saw sharpening machine, the combination with supporting bracket A; and guide-rods $o$ and $o'$ mounted thereon; of frame U slidably mounted upon said guides; arbor 3 journaled in frame U; set-collar 2; set-screw M'; collar M provided with upright projection, connected to arbor 3; link N'; rocking bar F'; standard N; sliding box F; threaded rod L'; rod L; crank $e$ and gear wheels $b$ and $b'$; gear wheel G; pinion $h$ and shaft K'; all substantially as shown and described.

4. In a saw sharpening machine, the combination with supporting bracket A; and guide-rods $o$ and $o'$ mounted thereon; of frame U slidably mounted upon said guides; arbor 3 journaled in frame U; threaded rod Z'; elbow Z; connecting rod $y$; crank $g$; set collar 2; set-screw M'; collar M provided with upright extension, connected to arbor 3; connecting link N'; rocking bar F'; sliding box F; threaded rod L'; standard N; connecting rod L; crank $e$; elliptical gears $b$ and $b'$; swinging frame A'; box 4; threaded rod $l'$; arbor 5 journaled in frame A'; bar $n$; connecting rod $m$; crank $g'$; pawl H; upright arm I; pawl H'; upright arm I²; shaft 1; arm I'; connecting rod $m'$; crank $e'$; elliptical gear wheels $a$ and $a'$; gear wheel G; pinion $h$; and shaft K'; all substantially as shown and described.

Dated May 17, 1894.

DEXTER HAZARD.

In presence of—
MARY L. RAYMOND,
WILLIAM J. O'MEARA.